United States Patent Office 3,400,319
Patented Sept. 3, 1968

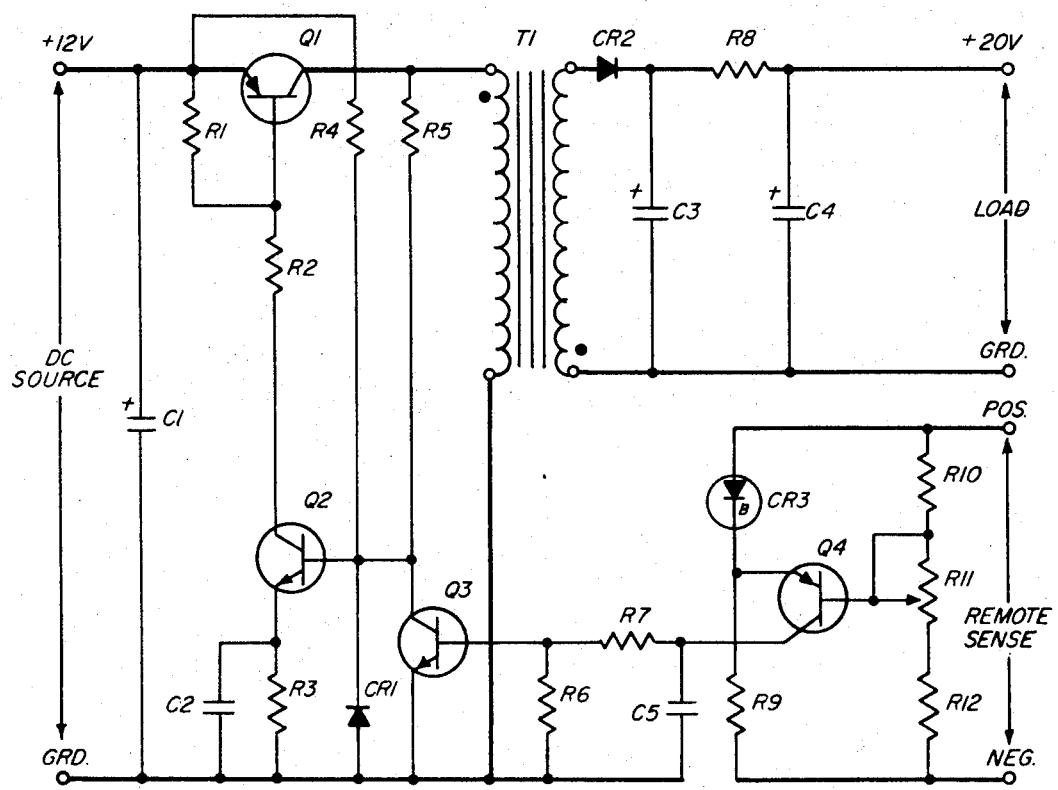

3,400,319
REGULATED VOLTAGE CONVERTER CIRCUIT FOR CONVERTING A DC VOLTAGE INTO A HIGHER DC VOLTAGE
Frederick A. Stich, Addison, Ill., assignor to Automatic Electric Laboratories, Inc., Northlake, Ill., a corporation of Delaware
Filed June 3, 1966, Ser. No. 555,155
2 Claims. (Cl. 321—2)

ABSTRACT OF THE DISCLOSURE

A transistorized power supply for converting a DC voltage to a higher DC voltage, employing a transistor as a series switching element, and control circuitry for determining the switching rate so as to provide a regulated output voltage, irrespective of load conditions.

This invention relates generally to direct current power supplies and more particularly to circuitry for maintaining the output potential level of a direct current power supply substantially constant.

The increased use of solid state circuit techniques in electronic equipment has made it mandatory that the direct current potential levels supplied to equipment of this type be maintained at substantially constant values to insure maximum efficiency of operation. Various regulation techniques include the use of transistor regulators of both series and switching types, silicon controlled rectifiers and magnetic amplifiers.

Many low voltage regulators are of the series type. That is, they employ transistors as a series pass device which operates essentially as an automatic voltage divider. In this instance the load resistance and the series passing element form the resistive elements. For any variation in the supply voltage or the load resistance, the resistance of the passing element changes to maintain a constant output voltage. The feedback control of the passing element consists of an error amplifier and reference voltage. The reference voltage and the error signal are compared and utilized to control the series element. In systems such as this, power dissipation of the pass element of the series regulator is quite large. A similar technique is used in switching regulators to obtain high efficiency. In this instance, the pass element is an efficient transistor switch in place of the dissipator of the series regulator. Control of the output voltage is obtained by varying the on and off time of the switch. The chopped voltage is reconverted to low ripple DC by a low pass filter. One drawback to the above-described voltage regulation techniques is a requirement that the input voltage be somewhat larger than the output voltage. Based on present techniques, if a higher output voltage is required than is available at the input, two separate stages, one for DC to DC conversion, and a second for regulation are usually required.

It is the primary object, therefore, of the present invention to provide an improved voltage regulator capable of producing a regulated output voltage higher in magnitude than the input voltage.

A further object of the present invention is to provide a highly efficient DC to DC converter that is adaptable to closed loop operation. Still another object of the present invention is to provide a voltage regulator having improved filtering characteristics.

Briefly, the foregoing and other related objects are attained according to the invention by employing a transistor as a power switch having a variable "off" and "on" time, determined in accordance with an error signal derived by sensing the output voltage at the load to which it is applied. In the present invention, a transformer having linear characteristics is included. During conduction of the power switch, energy is stored magnetically in the transformer. When the power switch is in its off state, the secondary voltage of the transformer will reverse polarity discharging the energy into the filter and then to the load. The rate at which energy is delivered from the source to the load is related to the duty cycle of the switching transistor. By controlling the ratio of "off" to "on" time in response to the error voltage, the output voltage can be regulated.

Other objects and features of the invention and a better understanding of its operation will be apparent from the following detailed description taken in conjunction with the accompanying drawing, the single figure of which is a circuit diagram of a DC to DC converter having regulation of the output voltage according to the present invention.

Referring now to the drawing there is illustrated a DC to DC converter for deriving a regulated +20 volt output from a 12 volt DC source. Transistor Q1 is a power switch controlling the power applied to the primary of transformer T1. When Q1 is conducting, energy is stored magnetically in transformer T1 which is resigned to have the properties of a linear inductor. When transistor Q1 stops conducting, the secondary voltage of transformer T1 reverses polarity and through diode CR2 discharges the stored energy into the filter consisting of capacitor C3, capacitor C4, and resistor R8 and then to the load.

When 12 volts DC is initially applied to the input terminals, transistor Q2 is biased by resistor R4 into the "on" condition. Conduction of transistor Q2 causes transistor Q1 to conduct, permitting charging current to flow into the primary of transformer T1. The induced voltage developed by T1 causes an increase in the forward bias current applied to Q2 through resistor R5. At this time, the collector current of transistor Q1 is increasing linearly with time as shown by the following approximate relationship:

$$I_c1 = \frac{E_{in}}{L_p}t$$

where $I_c1$ is the collector current of transistor Q1,
$E_{in}$ is the input voltage, and
$L_p$ is the primary inductance of transformer T1.

The base current applied to transistor Q1 is fixed by the value of resistors R2 and R3. Therefore, when the collector current of transistor Q1 becomes greater than the base current, multiplied by the current gain of transistor Q1, the transistor will go out of saturation. The polarity of the transformer primary will now reverse turning off transistor Q2 and effectively opening transistor Q1. To protect transistor Q2, diode CR1 is connected between ground and the base of transistor Q2. When the polarity of the transformer primary reverses, applying reverse battery potential to the base of Q2, diode CR1 will conduct, limiting the reverse voltage across the base emitter junction of transistor Q2, to that of the diode (CR1) forward drop. The approximate conduction time relationship is as follows:

$$t_{on} = \frac{B_1 L_p}{R_2 + R_3}$$

where $t_{on}$ is the conduction time,
$B_1$ is the common-emitter current gain of transistor Q1, and
$R_2 + R_3$ are the resistances of resistors R2 and R3.

Since the average voltage across a transformer winding is zero, the "off" time of transistor Q1 can be easily calculated. The following equation expresses this quantity in terms of the circuit parameters and the conduction time:

$$t_{off} = a \frac{E_{in}}{E_o} t_{on}$$

where $t_{off}$ is the off time of transistor Q1,
$a$ is the ratio of the number of secondary turns to primary turns, and
$E_o$ is the regulated output voltage.

Based on the above results the approximate expression for the power delivered to the regulator output is obtained from the following:

$$P_o = \frac{1}{2} \eta \frac{E_{in}^2}{1 + 2\frac{E_{in}}{E_o}} \frac{t_{on}}{L_p}$$

where $P_o$ is the output power of the supply, and
$\eta$ is the power supply efficiency.

Filtering for the present regulator is unusual in the sense that the transformer T1 acts as one of the filter elements. Because of the charge-discharge type of operation, the transformer T1 acts as a current limited source during discharge. For a capacitive filter, the output ripple will be lower than for a source which is not current limited. The output ripple for a capacitive filter may be calculated from the following equation:

$$\Delta e_0 = \frac{1}{C} \left[ \frac{E_{in}}{aL_p} t_{on} t_{off} + I_L |t_{on} - t_{off}| \right]$$

where $\Delta e_o$ is the peak-to-peak output ripple voltage,
C is the output capacitance, and
$I_L$ is the output load current.

From the above, it will be observed that the input conditions ($E_{in}$) see primarily a choke-input filter and the output conditions ($I_L$) see a capacitive filter. Also, $t_{off}$ may be set equal to $t_{pn}$ to obtain a minimum ripple with respect to $t_{off}$. For $t_{on}$ equal to $t_{off}$, the equation becomes:

$$P_o = \frac{\eta}{8f} \frac{E_{in}^2}{L_p}$$

where $$f = \frac{1}{t_{on} + t_{off}}$$

Thus the power delivered to the load is inversely proportional to the output frequency. By varying the base current to transistor Q1 its on time will vary on the basis of $1/2f$. The output power will then also be linearly varied. This may be demonstrated by addition of a series resistance $R_x$ (not shown) to $R2 + R3$. The output power will depend on $R_x$ as follows:

$$P_o = \frac{B_1}{4} E_{in}^2 \frac{1}{R2 + R3 + R_x}$$

where $R_x$ is the control resistance.

In the disclosed circuit configuration, transistor Q2 will provide this necessary control resistance. Transistor Q2, in turn, is controlled by an error detector.

The error detector consists of transistor Q4 whose base is connected to a voltage divider consisting of resistors R10, R11 and R12 which are connected across the positive and negative remote sense terminals, which in turn are connected to the load. The emitter of transistor Q4 is connected between breakdown diode CR3 and resistance R9. By action of diode CR3 a constant reference voltage is thus applied to the emitter of Q4. The collector current of transistor Q4 will increase or decrease depending on the voltage at the load as derived from the voltage divider connected to the base of transistor Q4.

The error signal derived from the collector of transistor Q4 is applied to the base of transistor Q3 for further amplification. Transistor Q3 in turn acts as a variable resistance in a voltage divider consisting of resistor R5 and transistor Q3 which together provide the base bias to transistor Q2.

In a practical embodiment constructed in accordance with the present invention the total regulation found in the present system is less than ±5% when the input voltage is restricted to a range of +11.6 to +12.4 volts. The ripple and dynamic regulation is less than ±100 millivolts peak; this regulation was achieved where load current changes did not exceed 44 milliamperes.

Various modifications apart from those shown may be made in the invention without departing from the true spirit thereof. For example, other techniques for deriving the error voltage might well be employed without departing from the invention. Likewise, the disclosed filtering circuitry may take other forms. It is the intention, therefore, that the invention not be limited to what has been shown and described except as such limitations appear in the appended claims.

What is claimed is:

1. A voltage regulator for connection between a source of direct current potential and a load comprising: storage means comprising a transformer including a primary winding connected to said source and a secondary winding connected to said load; switching means comprising a first transistor connected between said source and said primary winding; control means comprising a second transistor connected to said first transistor and to said primary winding; biasing means connecting said second transistor to said source, operated to render said second transistor conductive; said first transistor operated in response to said second transistor being rendered conductive, to conduct current from said source to said primary winding in continually increasing amounts; said transformer operated in response to continually increasing current conducted to said primary winding to store energy in proportion to the amount of current conducted thereto; said first transistor further operated in response to said current reaching a predetermined value to limit further conduction of said current; said transformer further operated in response to said current limiting to discharge said energy stored therein; said secondary winding conducting a portion of said discharged energy to said load, as a direct current potential; said primary winding conducting a portion of said discharged energy to said second transistor as a direct current potential, to render said second transistor non-conductive; said first transistor rendered non-conductive in response to said second transistor being rendered non-conductive; and error detection means comprising a source of reference potential, sensing means connected to said load, and a third transistor connected to said sensing means and to said reference potential source, operated in response to differences between said reference potential and the potential sensed by said sensing means at said load, to produce an error signal; amplifier means connected between said third transistor and said second transistor, including a fourth transistor operated in response to said error signal to determine the quantity of energy discharge required to render said second transistor non-conductive.

2. A voltage regulator as claimed in claim 1, further including filter means comprising at least one capacitor connected across said secondary winding, operated in response to the discharge of energy from said transformer to reduce the ripple content of said direct current potential conducted to said load.

References Cited
UNITED STATES PATENTS

| | | | |
|---|---|---|---|
| 2,791,739 | 5/1957 | Light | 321—2 |
| 3,109,979 | 11/1963 | Faulkner | 323—22 |
| 3,114,096 | 12/1963 | Projain | 321—2 |
| 3,134,940 | 5/1964 | Massey et al. | 321—2 |

LEE T. HIX, *Primary Examiner.*

W. H. BEHA, JR., *Assistant Examiner.*